United States Patent
Beugnot et al.

[19]

[11] Patent Number: 6,002,111
[45] Date of Patent: Dec. 14, 1999

[54] HEATING DEVICE FOR FOODSTUFFS, PARTICULARLY FOR FRYING, WITH AN OUTER BOWL

[75] Inventors: Bernard Beugnot, Is-sur-Tille; Jean-Claude Bizard, Fontaine-les-Dijon; Jean-Marie Thevenin, Bourberain, all of France

[73] Assignee: SEB S.A., Ecully, France

[21] Appl. No.: 08/793,075

[22] PCT Filed: Aug. 17, 1995

[86] PCT No.: PCT/FR95/01090

§ 371 Date: Feb. 18, 1997

§ 102(e) Date: Feb. 18, 1997

[87] PCT Pub. No.: WO96/04832

PCT Pub. Date: Feb. 22, 1996

[30] Foreign Application Priority Data

Aug. 17, 1994 [FR] France .................................. 94 10189

[51] Int. Cl.[6] .................................................. F27D 11/00
[52] U.S. Cl. ........................................... 219/433; 219/385
[58] Field of Search ................................... 219/433, 436, 219/439; 99/403, 410–413, 415, 418

[56] References Cited

U.S. PATENT DOCUMENTS 2,725,460  11/1955  Braski et al. .
3,508,485   4/1970  Munsey .
3,859,505   1/1975  Herbrand ................................. 219/436
4,138,606   2/1979  Brown ..................................... 219/436
4,282,423   8/1981  Volz ........................................ 219/490
4,574,183   3/1986  Knauss .................................... 219/439
4,995,312   2/1991  Leiros ..................................... 219/439
5,048,400   9/1991  Ueda et al. .............................. 99/332
5,092,229   3/1992  Chen ........................................ 99/337
5,567,458  10/1996  Wu ......................................... 219/433

FOREIGN PATENT DOCUMENTS 0 560 431 A2  of 0000  European Pat. Off. .
0 295 159     of 0000  France .
1510997       of 0000  France .
2239818       of 0000  Japan .

Primary Examiner—Tu Ba Hoang
Assistant Examiner—Thor Campbell
Attorney, Agent, or Firm—Pillsbury Madison & Sutro

[57] ABSTRACT

A cooking appliance, in particular a heating appliance for foodstuffs, for example for deep-frying in oil, including a removably mounted bowl (7) surrounded by a spaced outer skirt (2), a heating device (15, 17, 18) arranged under the bowl (7), and a heating control member (30). The appliance further has an outer bowl (10) at least partially surrounding all the faces of the removably mounted bowl (7), the outer bowl (10) being mounted between the removably mounted bowl (7) and the outer skirt (2) and being spaced therefrom, while the heating device (15, 17, 18) is fixedly mounted on the outer bowl (10).

16 Claims, 2 Drawing Sheets

6,002,111

HEATING DEVICE FOR FOODSTUFFS, PARTICULARLY FOR FRYING, WITH AN OUTER BOWL

TECHNICAL FIELD

The present invention relates to the general technical field of apparatus for heating or cooking foodstuffs conceived in particular for deep-frying in oil.

The present invention concerns an apparatus for heating foodstuffs, in particular for deep-frying in oil, comprising a removably mounted bowl surrounded by a spaced thermal skirt, as well as heating means disposed beneath the bowl and associated with heating control means.

The present invention concerns more particularly, but not exclusively, an electric fryer intended for cooking foodstuffs such as french fries, meat or fish.

PRIOR ART

It has already been proposed, for example in French Patent FR-A1 510 977 to create electric fryers comprising a removable metallic bowl mounted to be supported by its upper peripheral edge on a thermal skirt forming the external part of the fryer. According to this form of construction, heating means are constituted by a sheathed spiral resistance fixed on the base of the fryer and associated with an assembly of thermal reflectors. The fryer is constructed so that in the position where it is supported on the thermal skirt, the bowl is maintained at a distance from the heating means which thus assures a heating by radiation.

Such an apparatus benefits quite obviously from the advantages connected with the removability of the bowl such as the ease of cleaning and of handling, but suffers from inconveniences connected with the very design of the apparatus. Thus, it has been found that the general thermal performance of the apparatus is not satisfactory because a large part of the thermal energy is lost or dissipated in directions other than those of the bowl. There follow a series of localized heatings in useless zones. Moreover, the absence of a complete thermal mastery significantly disturbs the operation of the thermal control means, to the extent that they are subjected to a series of diverse thermal influences that disturb the real thermal image of the bowl.

In order to obviate a part of the problems mentioned previously, it has already been proposed in patent application EP-A-0 587 300 to construct an electric fryer in which the heating means are fixed to rest on the removable bowl. In this patent application, the heating means are constituted by a sheathed resistance crimped or soldered on the external face of the bottom of the removal bowl. The solution selected in this patent application permits conserving the fundamental advantages of fryers equipped with a removal bowl, while benefiting from a good thermal transmission between the heating means and the removable bowl. In return, the solution chosen requires the development of a system for electrical connection between the terminals of the sheathed resistance and the fixed body of the fryer. Such a connection system, in addition to the fact that it constitutes a limitation with regard to fabrication and a supplemental cost for the apparatus, is susceptible following a series of manipulations of the removable bowl to no longer perform its connection function perfectly. Finally, the presence of sheathed heating elements on the removable bowl destined to undergo a series of repeated washings risks progressive deterioration of the sheathed elements and accelerates their wear. It is equally not excluded that water can penetrate to the very interior of the sheathed elements by way of microcracks.

It has certainly already been envisioned, notably in utility model GM-90 17 621 9 or in the application EP-0560431, these two documents being of the same applicant and relating to the same appliance, to produce electric fryers whose heating means is fixed on the body of the appliance at a distance from the bottom of the removable bowl. To improve the thermal effectiveness of this heating mode it has been envisioned to mount between the thermal skirt and the walls of the bowl a simple vertical screen forming a reflector, surrounding only the lateral and vertical walls of the bowl. The arrangement chosen implies nevertheless the use of heating means of the halogen type associated with a ceramic-based bowl bottom in order to master the thermal flux. Such a form of construction has been found to have a high fabrication cost to the extent that it requires recourse to materials having a high per unit cost, and to the extent equally that it implies the assembly of numerous pieces for maintaining the assembly of the heating system under the removable bowl. The heating system is not as a result mounted in a fixed manner on the vertical screen forming a reflector, but is to the contrary particularly supported by a main support and a series of pins supported on the housing of the fryer.

SUMMARY OF THE INVENTION

The object assigned to the invention aims in consequence to provide a remedy to the different drawbacks of the prior art mentioned previously, and to propose a new appliance for heating foodstuffs equipped with a removable bowl having varied uses, said appliance being of a simplified design, economical to fabricate, and in which the thermal flux and the aspects of safety of operation are perfectly mastered.

Another object of the invention aims to propose a heating appliance for foodstuffs of a simplified design and in which the thermal exchange between the heating means and the removable bowl is optimized.

Another object of the invention aims to furnish a new heating appliance for foodstuffs in which the thermal losses are limited and the risks of overheating are equally limited.

Another object of the invention is to furnish a heating appliance for foodstuffs in which the risks of overflowing of oil or of inflammation are limited.

A supplemental object of the invention is to furnish a heating appliance for foodstuffs in which the thermal regulation is assured in a reliable and precise manner.

The objects assigned to the invention are achieved with the aid of a heating appliance for foodstuffs, in particular for the achievement of deep-frying in oil, comprising a bowl which is removably mounted and surrounded by a spaced outer skirt, heating means disposed under the bowl, and means for thermal regulation of the heating, characterized in that it comprises an outer bowl at least partially surrounding all the faces of the bowl, said outer bowl being mounted between the bowl and the outer skirt, on the one hand, and spaced therefrom, the heating means being fixedly mounted on the outer bowl on the other hand.

BRIEF DESCRIPTION OF THE DRAWINGS

Other objects and advantages of the invention will appear in greater detail from a reading of the description which follows with reference to the attached drawings, given by way of illustrative and nonlimiting examples in which.

BEST MANNER OF CARRYING OUT THE INVENTION

Figure 1:
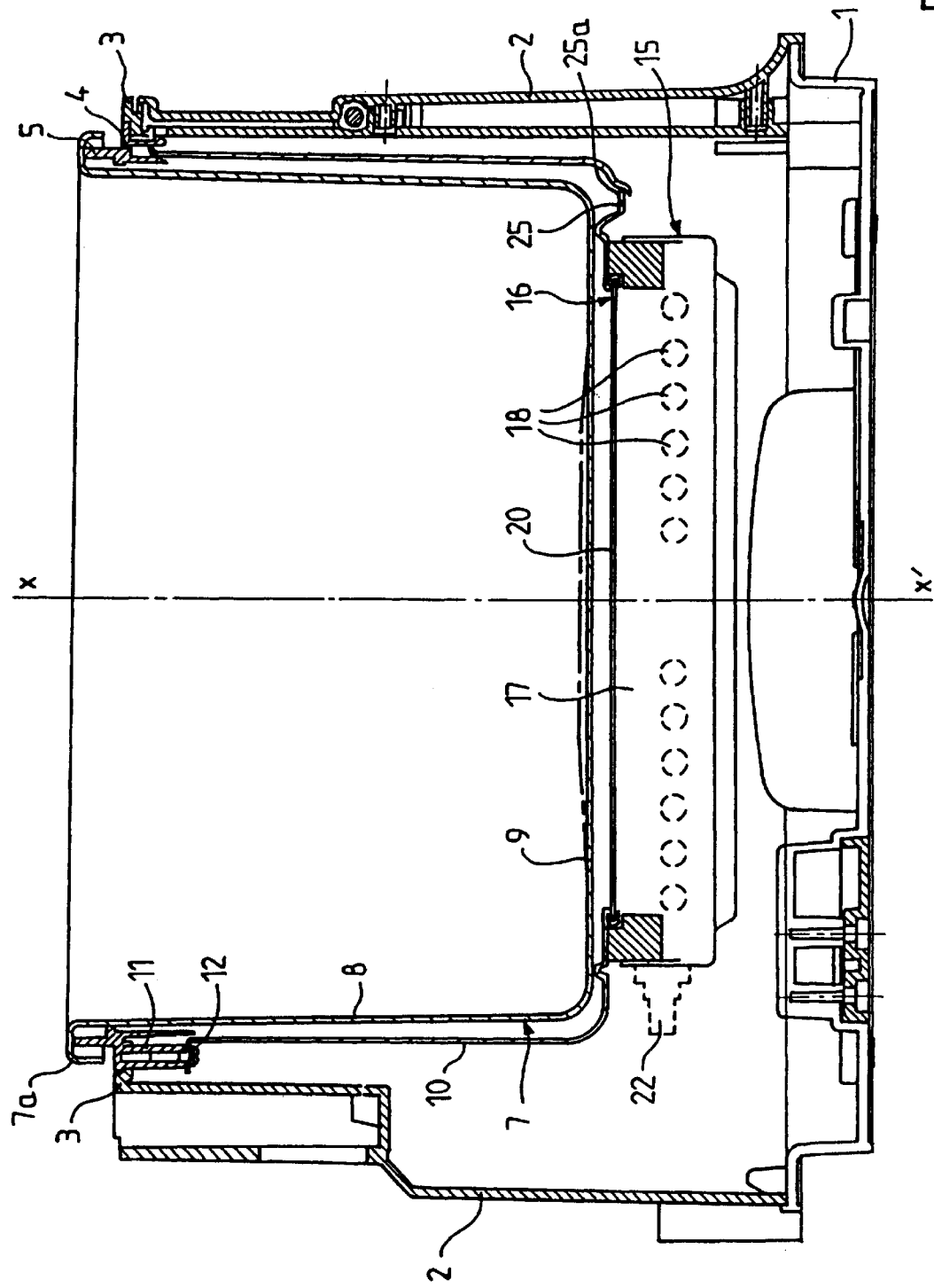
FIG. 1 shows according to a simplified cross section an example of an electric fryer according to the invention.

In the example of a preferred embodiment shown in FIG. 1, the heating appliance for foodstuffs according to the invention is constituted by an electric fryer comprising a base 1 upon which is attached an outer skirt 2 forming the external envelope of the fryer. The outer skirt 2 is, in a conventional manner, preferably made of a plastic material which is economical and has a low resistance to heat, such as polypropylene, not resistant to the thermal energy continuously dissipated by a conventional high temperature heating element conventionally utilized in electric fryers.

The upper part 3 of outer skirt 2 is fixed to an annular ring 4 mounted to be supported on and to overhang the outer skirt 2. In a conventional manner, annular ring 4 is for example fixed by clipping on the external edge of outer skirt 2, and it comprises a vertical rib or a series of vertical pieces 5 distributed regularly around the periphery of annular ring 4. This latter is advantageously made of a thermally insulating material continuously resistant to the operating temperatures of the fryer, for example of polyamide, polyester, or PBTP.

The electric fryer also comprises a bowl 7 made of a metallic material, mounted in a removable manner on pieces 5 via an edge 7a rolled in a radially external direction with respect to the longitudinal axis x–x'. Bowl 7 defines lateral walls 8 spaced from external skirt 2 and a bottom 9 advantageously curved in a manner to have its convex surface face in the direction of the interior of bowl 7, in order to reduce deformations.

The mounting of bowl 7 on annular ring 4 at a distance from outer skirt 2 in order to leave a sufficiently thick layer of air to limit the temperatures of outer skirt 2 to a value compatible with the thermal behavior of the plastic material of this skirt is advantageously at all points in accordance with the patent application EP-A-0.295.159, the specification of which is here incorporated by reference in the present application.

According to an essential characteristic of the invention, the electric fryer comprises an outer bowl 10, advantageously made of a metallic material, enveloping on all of its faces bowl 7 in the space between this latter and outer skirt 2 and at least on a part of the height of lateral walls 8 and at least on a part of bottom 9. Outer bowl 10 is in consequence spaced from lateral walls 8 and bottom 9, and thus surrounds bowl 7 in a preferential manner over its entire height. Outer bowl 10 is advantageously fixed on annular ring 4 and supported by this latter at a distance from bowl 10 and outer skirt 2. The fixation of outer bowl 10 is obtained for example by screwing of said outer bowl 10 on annular ring 4. For this purpose there are advantageously provided a series of four tapped holes 11 arranged in annular ring 4 and distributed annularly in a regular manner in order to permit the passage of four fixation screws 12 to assure the assembly of outer bowl 10 on annular ring 4.

The fryer according to the invention also comprises a heating means 15 mounted in a fixed manner on outer bowl 10. According to a preferred version of the invention, heating means 15 are directly immovably attached to outer bowl 10 and supported by this latter at a distance from bottom 9 of bowl 7. Advantageously, the heating means are mounted under outer bowl 10 in line with bottom 9 and with an opening 16 formed in outer bowl 10. Opening 16 is for example of an area slightly less than the surface of bottom 9, and for example of circular form, while heating means 15 are constituted by a mass of refractory material 17 in which extends a heating resistance 18, for example in the geometric form of a spiral. To prevent direct access to incandescent heating resistance 18, outer bowl 10 is provided with a protection screen 20 extending across opening 16 and fixed, for example by crimping, directly on the plate constituting the bottom of outer bowl 10.

In a modified embodiment of the fryer according to the invention, protection screen 20 can be replaced by any protection element constituted by a material permeable to thermal radiation. The protection element is for example of glass.

Heating means 15 comprise in a conventional manner an electric connection block 22 connected to an electric cable not shown in FIG. 1.

According to a preferred version of the invention, outer bowl 10 comprises an overflow preventing drain 25 arranged in its bottom plate, preferably at its periphery. Such a drain permits channeling and evacuation of a possible flow of liquid along the internal walls of outer bowl 10 and avoids all risk of pollution or inflammation of a liquid which can accidentally fall onto heating means 15.

Advantageously, the overflow preventing drain 25 is provided with flow holes 25a which permit channeling of possible liquids toward parts of the fryer which do not come in contact with heating means 15.

Figure 2:
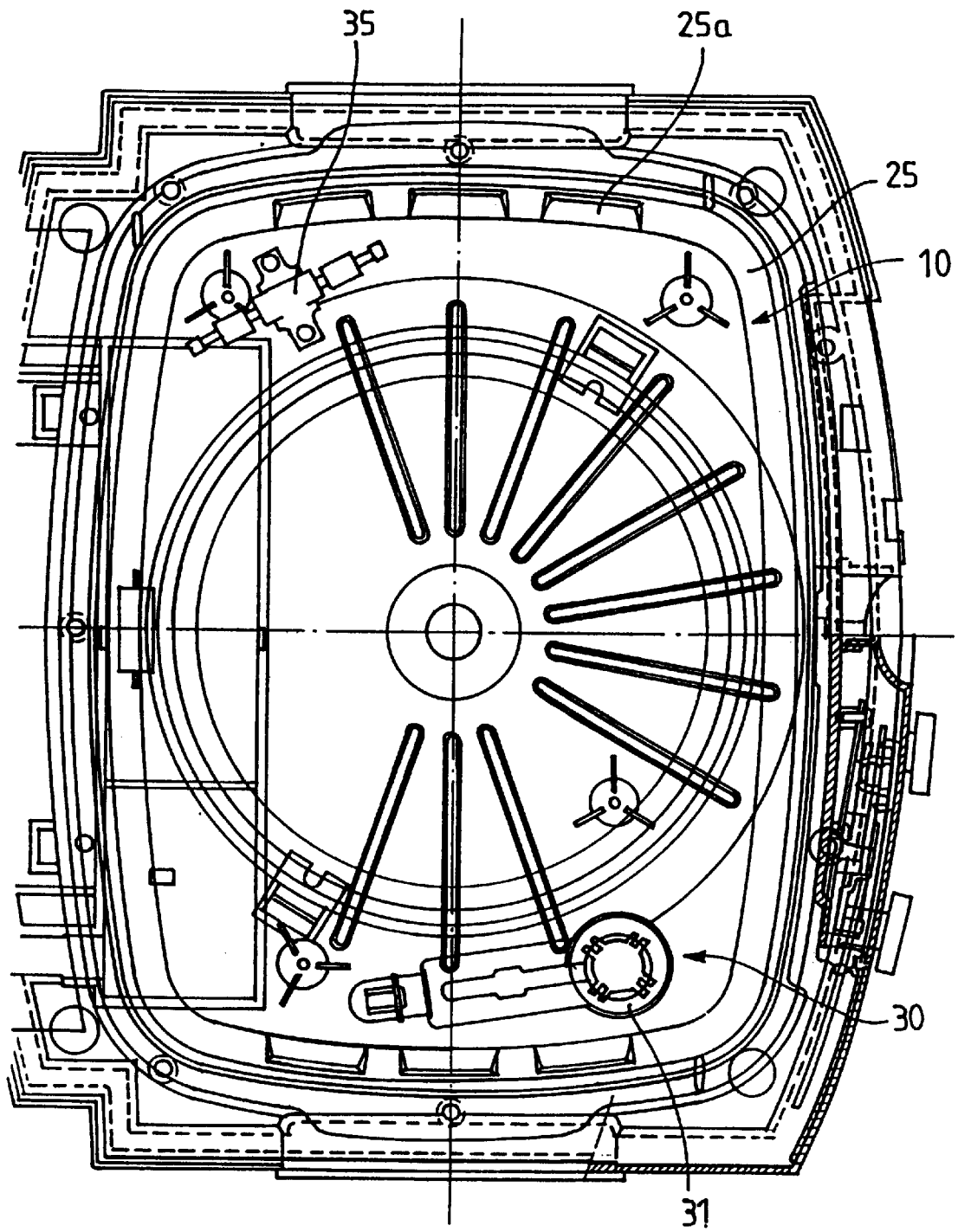
FIG. 2 represents in a top view the heating appliance according to the invention.

According to another variant of the embodiment shown in FIG. 2, the electric fryer according to the invention comprises thermal regulation means 30 fixed on the outer bowl 10. The thermal regulation means comprise a sensor 31, of the NTC type, elastically supported, by a support element 32, on bottom 9 when bowl 7 is in the cooking position, i.e., rests supported on annular ring 4. According to a preferred embodiment, sensor 31 is mounted on a sensor support which is clipped onto outer bowl 10. Thermal regulation means 30 are also associated with a thermic fuse 35 fixed on outer bowl 10.

Thermic fuse 35 is for example crimped onto outer bowl 10.

According to another embodiment of the electric fryer according to the invention, regulation means 30 comprise sensor 31 and thermic fuse 35.

By way of a modification it is obviously possible to use an outer bowl 10 of which the height of the lateral walls is less than the height of lateral walls 8 of bowl 7. In this case outer bowl 10 is no longer fixed by screwing onto annular base 4, but by any appropriate means directly on external skirt 2 or indirectly on a supplemental support means fixed on external skirt 2.

Advantageously, bowl 7 is blackened on the outside by a product of the lacquer type to increase the capacity for absorption by radiation.

Bowl 7 is covered at the inside by an anti-adhesive or stainless steel coating.

The operation of the electric fryer according to the invention is the following.

The user, after having poured the oil necessary for frying into bowl 7, switches on the appliance. When the frying temperature is achieved, possibly indicated by a lighted indicator, the user proceeds with the frying itself by introducing the foodstuffs to be cooked into the oil bath. The structure of the fryer according to the invention permits heating means 17, 18 to assure by radiation heating of the oil and cooking of the foodstuffs, while outer bowl 10 associated with outer skirt 2 assures a good thermal screen and a good thermal isolation. Thus it is found that the temperatures attained at the level of refractory mass 17 are of the order of 450° C. while the temperatures attained substantially at the midpoint of the height of bowl 7 are of the order of 160° C. and that the temperatures attained at the bottom of outer bowl 10 are of the order of 230° C. At the level of the junction between outer bowl 10 and annular ring 5 the temperatures attained are of the order of 150° C., while the temperatures attained on the lower surface of the refractory mass facing base 1 are of the order of 270° C. In total, it is found that the structure of the fryer according to the invention permits an optimal mastery of the temperature rise of the totality of the zones of the appliance while permitting an optimal heating of bowl 7. Outer bowl 10 assumes at the same time a function of visual protection of the interior of the fryer in particular of outer skirt 2, while assuring a good thermal isolation toward the exterior of the appliance. In addition, outer bowl 10 assumes the function of preservation of the heating means and serves for the fixation of the thermal regulation means. The user can thus obtain the advantages of a removable frying bowl which can be utilized as a finished cooking receptacle, without limiting the performances and the safety of utilization of the appliance.

POSSIBILITIES OF INDUSTRIAL APPLICATION

The invention finds its industrial application in the fabrication of appliance for cooking foodstuffs by immersion in an oil bath, and in particular in the fabrication of electric fryers.

We claim:

1. Heating appliance constituted by a fryer for deep frying foodstuffs in oil, comprising a bowl (7) for holding oil, the bowl (7) being removably mounted and being composed of lateral walls (8) and a bottom (9), and said bowl (7) being surrounded at a distance by an outer skirt (2), heating means (15, 17, 18) disposed beneath the bowl (7) and means for thermal regulation (30) of the heating, characterized in that said appliance further comprises an outer bowl (10) enveloping at least part of the lateral walls and at least part of the bottom of the bowl (7), said outer bowl (10) being mounted with a spacing between the bowl (7) and the outer skirt (2) on the one hand, the heating means (15, 17, 18) being fixedly mounted on the outer bowl (10) on the other hand.

2. Appliance according to claim 1 characterized in that the heating means (17, 18) are fixed to the outer bowl (10) and supported by this latter at a distance from the bottom (9) of the bowl (7).

3. Appliance according to claim 2 characterized in that the heating means (17, 18) are mounted under the outer bowl (10), in line with the bottom (9) of the bowl and the outer bowl (10) has an opening between the heating means and the bottom of the bowl.

4. Appliance according to claim 3 characterized in that the outer bowl (10) is provided with a screen (20) for protection extending over the opening (16).

5. Appliance according to claim 1 characterized in that the heating means are constituted by a heating resistance (18) extending in a mass of a refractory material (17).

6. Appliance according to claim 1 characterized in that the outer bowl (10) is metallic.

7. Appliance according to claim 1 characterized in that the outer bowl (10) encircles the bowl (7) substantially over all of its height.

8. Appliance according to claim 1 characterized in that the outer bowl (10) comprises an anti-overflow drain (25) arranged at the periphery of its bottom plate, said anti-overflow drain (25) being provided with at least one flow hole (25*a*).

9. Appliance according to claim 1 characterized in that the bowl (7) is supported in a removable manner on the outer skirt (2) by an annular ring (4) itself supported by the outer skirt (2).

10. Appliance according to claim 9 characterized in that the outer bowl (10) is fixed on the annular ring (4) and supported by this latter at a distance from the bowl (7) and the outer skirt (2).

11. Appliance according to claim 1 characterized in that the thermal regulation means (30) are fixed on the outer bowl (10).

12. Appliance according to claim 11 characterized in that the thermal regulation means (30) comprise a sensor (31) of the NTC type, elastically supported on the bottom (9) of the bowl (10) when this latter is in the cooking position.

13. Appliance according to claim 11 characterized in that the thermal regulation means (30) are associated with a thermal fuse (35) fixed on the outer bowl (10).

14. Appliance according to claim 1 wherein said heating means are attached to, and supported entirely by, said outer bowl (10).

15. Appliance according to claim 1 wherein said outer bowl (10) is a one-piece metal component.

16. Appliance according to claim 15 wherein said outer bowl (10) is spaced from said lateral walls and said bottom of said bowl (7).

* * * * *